R. B. ROBBINS.
Improvement in Potato Diggers.
No. 120,775.  Patented Nov. 7, 1871.
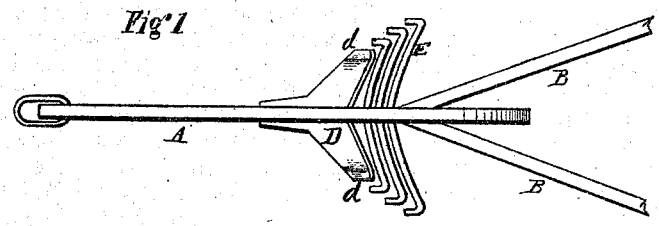
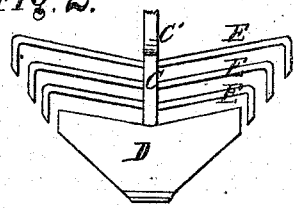
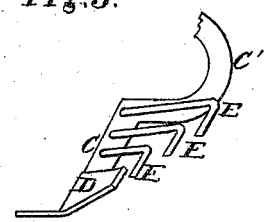
Witnesses  
E. H. Bates  
T. B. Curtis
Inventor:  
R. B. Robbins  
Chipman Hosmer & Co  
Attys

UNITED STATES PATENT OFFICE.

RICHARD B. ROBBINS, OF ADRIAN, MICHIGAN.

IMPROVEMENT IN POTATO-DIGGERS.

Specification forming part of Letters Patent No. 120,775, dated November 7, 1871.

*To all whom it may concern:*

Be it known that I, RICHARD B. ROBBINS, of Adrian, in the county of Lenawee and State of Michigan, have invented a new and valuable Improvement in Potato-Diggers; and I do hereby declare that the following is a full, clear, and exact description of the construction and operation of the same, reference being had to the annexed drawing making a part of this specification, and to the letters and figures of reference marked thereon.

Figure 1 of the drawing is a plan view of my invention. Figs. 2 and 3 are details.

This invention has relation to potato-diggers; and the novelty consists in the construction and arrangement of a series of arms or separators projecting from the sides of a shovel-beam, and designed for the purpose of separating the potatoes from the earth and depositing them on the surface, as hereinafter described.

In the drawing, A represents a draft-beam, similar to the beam of an ordinary plow, and provided with the handles B and plow-standard C. D represents the shovel secured to the end of the standard C. It is constructed, as shown, with a long flattened point to enter the hills easily and pass under the potatoes. The side edges are bent up at $d$ to form cutters. E represents arms projecting back from the sides of the standard C in an oblique horizontal direction, and parallel to one another. They are of gradually-varying lengths, and have their outer ends bent down, as shown. In their arrangement they are made to correspond to the curvature or bevel of an enlarged shovel, serving the same purpose as a horizontally-ribbed shovel. As the shovel enters and moves through the potato-hill the earth falls back between the arms E, leaving the potatoes free and casting them to either side. The vines fall back over the tops of the arms and do not become entangled.

Should the earth be insufficiently broken to set the potatoes free, the bent ends of the arms E rake them out. In order to allow sufficient space for the vines to fall back through, and to prevent them from being bent down in front, the standard C should be constructed with a curve, C', as shown in Fig. 3 of the drawing.

I claim as my invention—

In a potato-digger having the horizontal bent arms E arranged as described, the standard C, bent at C', as and for the purpose specified.

In testimony that I claim the above I have hereunto subscribed my name in the presence of two witnesses.

RICHARD B. ROBBINS.

Witnesses:
WM. S. GORMLY,
J. H. SIMPSON. (114)